(12) United States Patent  
Bellasalma et al.

(10) Patent No.: US 6,997,690 B2  
(45) Date of Patent: Feb. 14, 2006

(54) FLUSHLESS MOLD VALVE ASSEMBLY

(75) Inventors: Gerard Jay Bellasalma, Yorba Linda, CA (US); Joon Taek Kim, West Hollywood, CA (US); Lloyd Ramsey, Winters, CA (US)

(73) Assignee: Masco Corporation, Taylor, MI (US)

( * ) Notice: Subject to any disclaimer, the term of this patent is extended or adjusted under 35 U.S.C. 154(b) by 735 days.

(21) Appl. No.: 09/924,285

(22) Filed: Aug. 8, 2001

(65) Prior Publication Data

US 2003/0031745 A1    Feb. 13, 2003

(51) Int. Cl.  
*B29C 45/23* (2006.01)

(52) U.S. Cl. .................. 425/4 R; 366/182; 425/130; 425/557; 425/562

(58) Field of Classification Search ............... 425/4 R, 425/130, 207, 817 R, 200, 562, 557; 366/182  
See application file for complete search history.

(56) References Cited

U.S. PATENT DOCUMENTS

| | | | |
|---|---|---|---|
| 4,188,356 A | | 2/1980 | Weber et al. |
| 4,239,732 A | * | 12/1980 | Schneider .................. 425/4 R |
| 4,898,327 A | | 2/1990 | Sperry et al. |
| 5,240,325 A | | 8/1993 | Monchiero |
| 5,435,710 A | * | 7/1995 | Gumery et al. ............. 425/562 |
| 5,498,151 A | * | 3/1996 | Nennecker .................. 425/4 R |
| 5,562,883 A | | 10/1996 | Salisbury et al. |
| 5,817,347 A | | 10/1998 | Tamcsin et al. |
| 6,143,214 A | | 11/2000 | Barlow |

OTHER PUBLICATIONS

Merriam-Webster's Collegiate Dictionary, p. 978, 1996.*

* cited by examiner

*Primary Examiner*—Tim Heitbrink  
(74) *Attorney, Agent, or Firm*—Carlson, Gaskey & Olds

(57) ABSTRACT

A low-pressure mold valve assembly includes a coupler to removably attach a mix head to a mold assembly in an assembly line environment. A first piston which is rectilinear in cross section is movable within the first flow passage along a first axis by an actuator. A second piston is movable along a second axis substantially perpendicular to the first axis by a second actuator. After injection is complete, the second piston seals a mix chamber of the mix head while remnants of the matrix that remain in a flow passage are driven into the first flow passage by the piston. The first piston is then driven toward the mold port such that matrix remnants are further driven into the mold cavity. The coupler is thus cleared of remnants without flushing.

32 Claims, 7 Drawing Sheets

US 6,997,690 B2

FLUSHLESS MOLD VALVE ASSEMBLY

BACKGROUND OF THE INVENTION

The present invention relates to a low-pressure mold assembly, and more particularly to a valve assembly for a mold which minimizes the frequency of flushing.

A low pressure molding system provides for the mixing of at least two fluid materials to form a settable mixture which is discharged into a mold cavity to form a finished article. One particular mixture includes three fluid material components which form a matrix having a catalyst, a matrix polymer and a foaming agent. The fluid materials are typically fed from a supply by a delivery or feed assembly which communicates with a mixing head. The fluid materials are mixed by the mixing head and discharged into the mold cavity to form the molded article.

Typically, the mold valve and mix head must be flushed after each cycle to remove remnants of the fluid material components to prevent the remnants from hardening within. This is time consuming and expensive as the flushing fluid must be disposed of after usage.

Accordingly, it is desirable to provide a valve assembly for a low-pressure mold which requires minimum flushing. It is also desirable to minimize the necessity of flushing the mix head between transfer from one mold assembly to the next to decrease the cycle time for production of each finished article.

SUMMARY OF THE INVENTION

The present invention provides a valve assembly which includes a coupler to removably attach a mix head to a mold assembly in an assembly line environment. The coupler is attached to a mold port such that the matrix is communicated from the mix head s through a fluid flow passage and into the mold cavity.

A piston which is rectilinear in cross section is movable within the first flow passage along a first axis by an actuator. By providing the piston, with straight walls, remnants of the matrix are more effectively wiped from the passage and driven into the mold cavity. In addition, the piston forms an effective seal at the intersection between the first flow passage and the second flow passage.

The mix head include a secondary portion of the second flow passage which aligns with the second flow passage within the coupler when the mix head is attached thereto. A second piston is movable along a second axis substantially perpendicular to the first axis by a second actuator. A third fluid flow passage communicates with the mix head mix chamber and the second flow passage During matrix injection, matrix is supplied from a feed system to the mix chamber. From the mix chamber the matrix is feed through the third flow passage and into the mix head second flow passage. The matrix continues into the coupler second flow passage and into the primary flow passage. The matrix then passes into the mold cavity through the mold port.

After injection is complete, the second piston seals the third flow passage while remnants of the matrix that remain in the second flow passage are driven into the first flow passage by the piston. The first piston is then driven toward the mold port. The orientation of the first piston and the second piston provides for the first piston to wipe matrix remnants from a face of the second piston. The seal between the first piston and mold port is now complete such that the molded article will cure within the cavity. The coupler is thus clear of remnants without flushing.

The present invention therefore provides a valve assembly for a low-pressure mold which requires minimum flushing. Further, the present invention minimizes the necessity of flushing the mix head between transfer from one mold assembly to the next to decrease the cycle time for each finished article.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
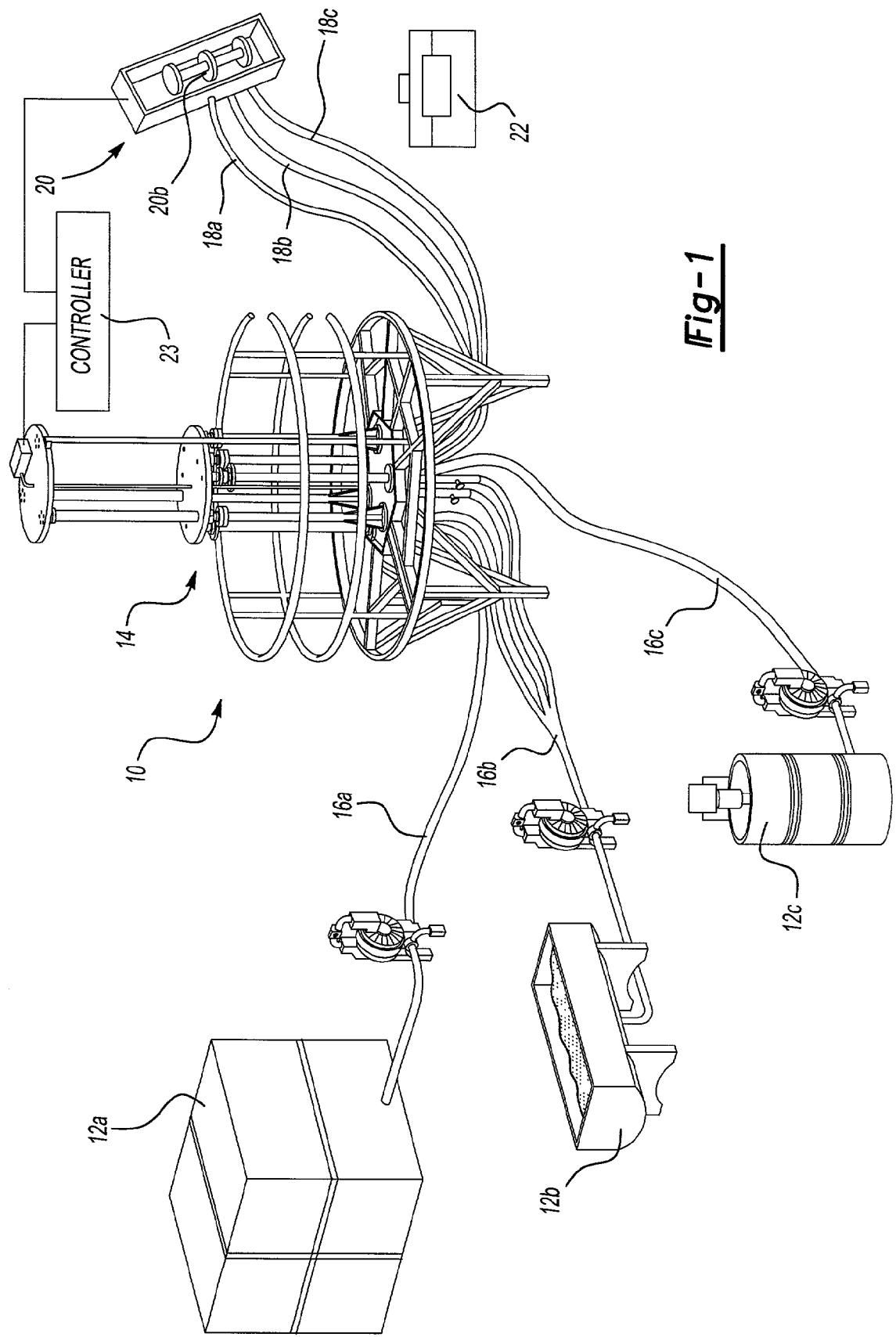
FIG. 1 is a simplified schematic representation of a multiple material molding system having a valve assembly designed according to the present invention.

FIG. 1 schematically illustrates a multiple material molding system 10. The system 10 generally includes a plurality of fluid material supplies 12A, 12B and 12C, which communicate with a feed assembly 14 through respective supply conduits 16A–16C. The feed assembly 14 drives a desired quantity of fluid material from each fluid material supply 12A–12C through output conduits 18A–18C to a mix head assembly 20. The mix head assembly 20 thoroughly mixes the fluid material from each fluid material supply 12A–12C and injects the final mixture into a mold assembly 22 or the like. Preferably, a controller 23 communicates with the feed assembly 14 and the mix head assembly 20 to assure the system 10 is operating within predefined parameters. Controls for injection-molding equipment are known in the art and further description of the algorithms will not be further detailed herein. System 10 is preferably utilized for molding of very large parts, and in particular bath tubs and shower surrounds.

Figure 2A:
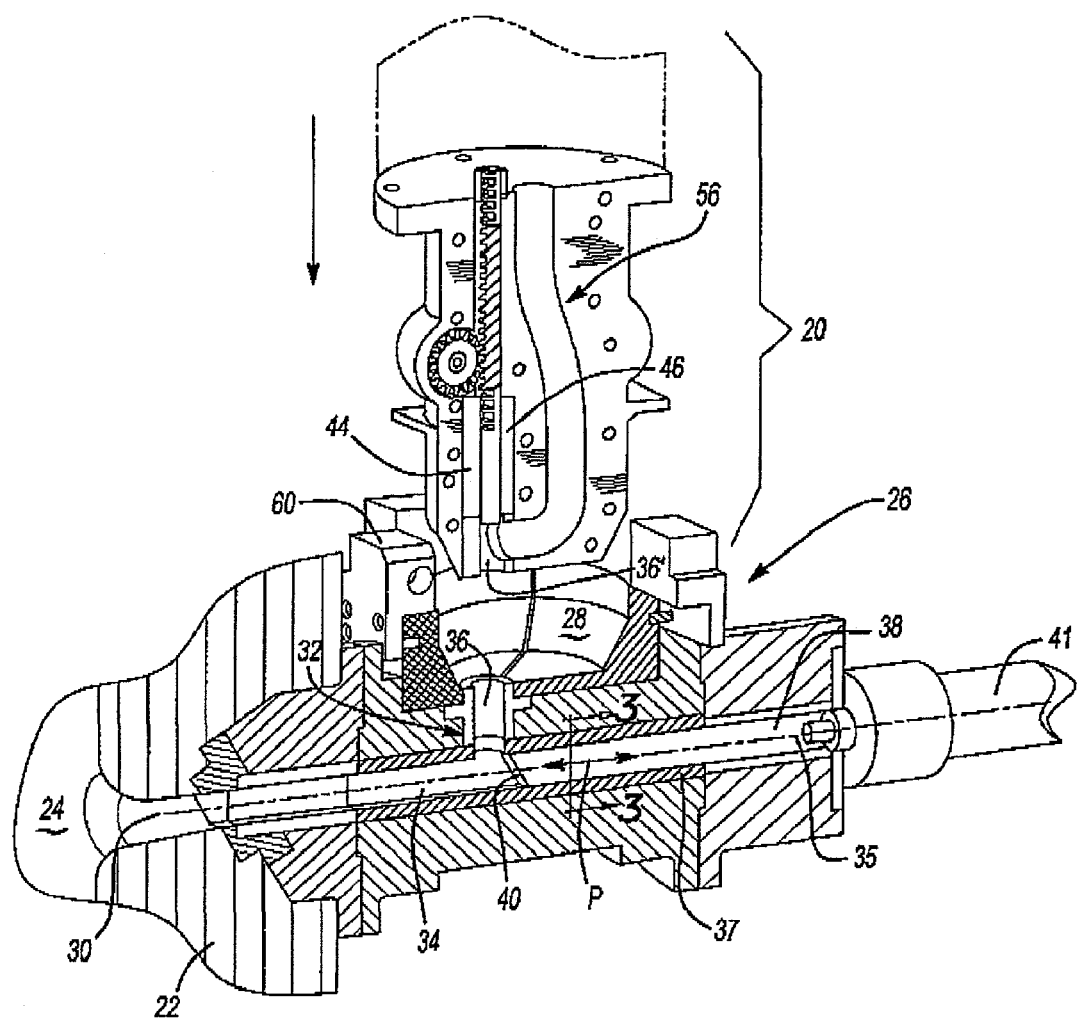
FIG. 2A is an expanded partial sectional view of a mix head assembly adjacent to a coupler mold assembly prior to engagement.

Referring to FIG. 2A, a partial sectional view of the mix head assembly 20 adjacent to the mold assembly 22 according to the present invention is illustrated. The mix head 20 mixes the multiple of fluid materials components e.g., matrix, to form a hardenable or settable mixture which is then discharged into the mold cavity 24 through a valve assembly 26. Typically, a single mix head 20 feeds the matrix into a multiple of mold assemblies which are arranged in an assembly line like environment. The matrix begins to set upon mixture and the valve assembly 26 according to the present invention minimizes matrix remnants such that the valve assembly 26 need not be flushed after each cycle injection.

The valve assembly 26 preferably includes a coupler 28 to removably attach the mix head 20 to the mold assembly 22. The coupler 28 is attached to a mold port 30 such that the matrix from the mix head 20 communicates through a fluid flow passage 32 and to the mold cavity 24. The fluid flow passage 32 preferably includes a first flow passage 34 which defines a first axis 35 and a second flow passage 36 substantially perpendicular to the first axis 35.

Figure 3:
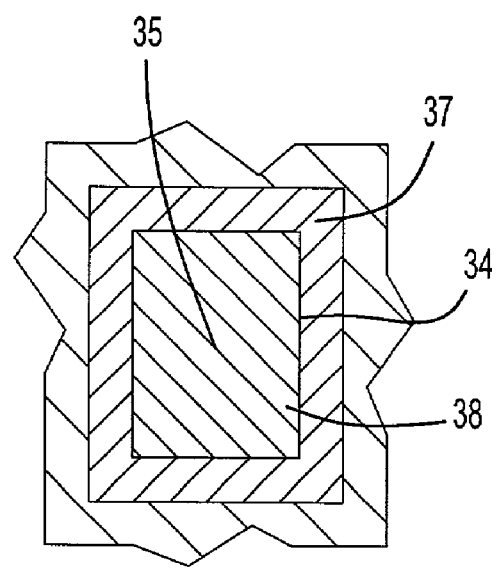
FIG. 3 is a sectional view of a piston taken along line 3—3 in FIG. 2A.

A piston 38 which is rectilinear in cross section (FIG. 3) is movable within the first flow passage 34 along the first axis 35. An actuator 41 such as a pneumatic, mechanical, electrical or hydraulic actuator drives the piston 38 along the first axis 35 as illustrated by double headed arrow P. Preferably, the piston 38 is substantially square in cross-section (FIG. 3) such that the piston 38 fits closely within the first flow passage 34. By providing the piston 38, with straight walls, remnants of the matrix are more effectively wiped from the passage 34 and driven into the mold cavity 24. In addition, the piston 38 forms an effective seal at the intersection between the first flow passage 34 and the second flow passage 36. The first flow passage 34 preferably includes a liner 37 (FIG. 3) of a low friction material such as Ultra High Molecular Weight Polyethylene (UHMEW), bronze, Teflon, or the like to assure minimal friction during movement or the piston 38.

Figure 2B:
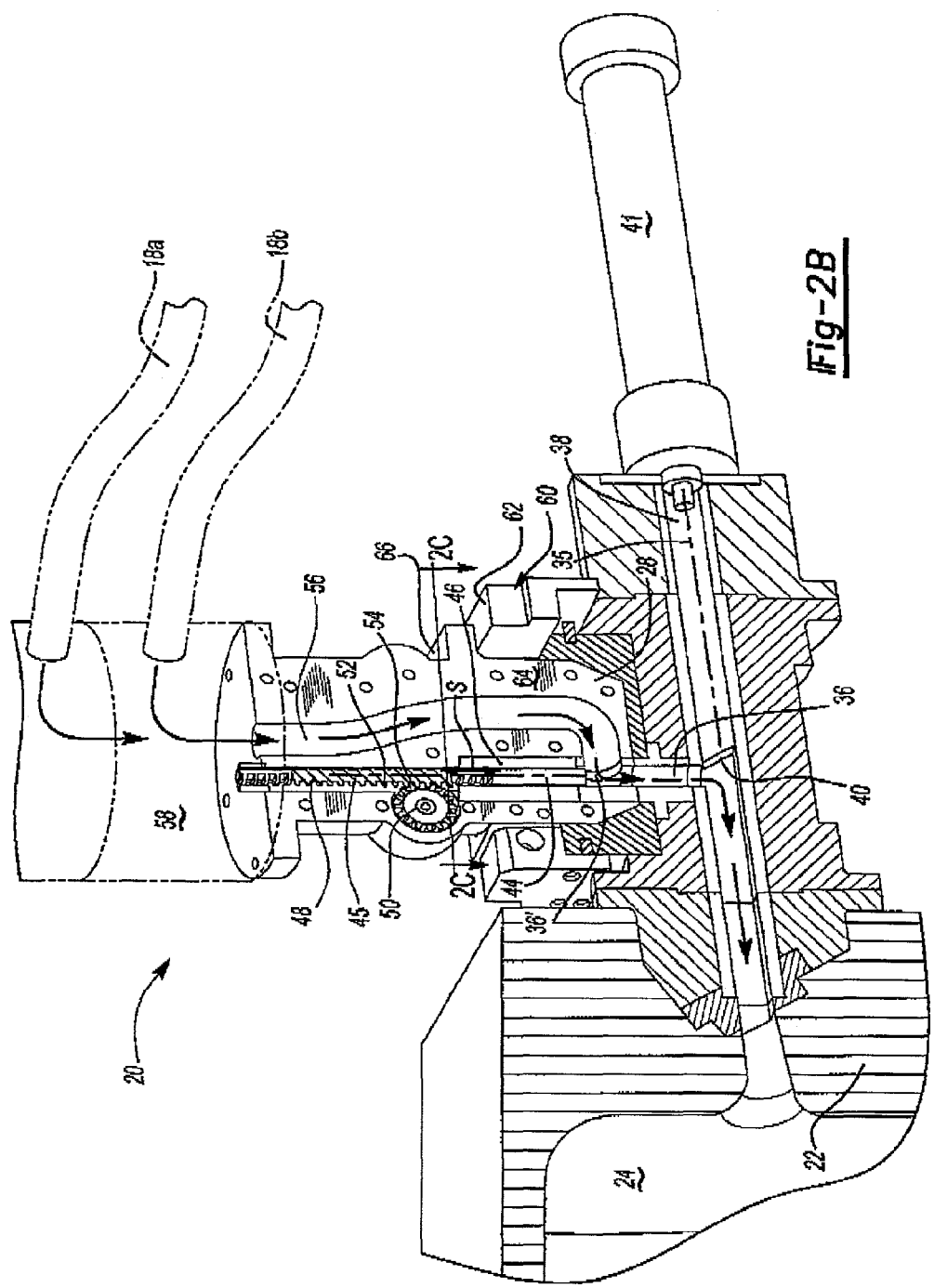
FIG. 2B is an expanded partial sectional view of the mix head assembly of FIG. 2A locked into the a valve assembly.
Figure 2C:
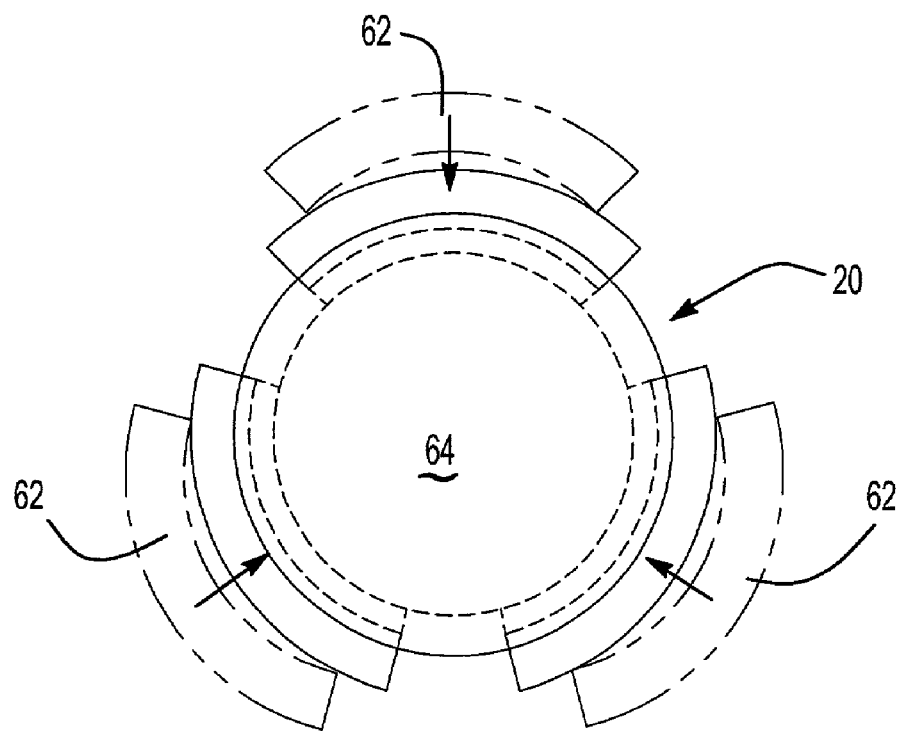
FIG. 2C is a sectional view of a lock assembly taken along line 2C—2C of FIG. 2B.

An end portion 40 of the piston 38 is preferably angled relative to the first axis 35. As illustrated in FIG. 2B, the mix head 20 is engaged with the mold assembly 22 at an angle for operator convenience. The end portion 40 of the first flow passage is thus angled to coincide with the piston end portion 40 to assure an effective substantially conformal seal of the mold cavity 24 when the piston 38 is in a closed position (FIG. 5C).

The mix head 20 include a secondary portion of the second flow passage 36' which aligns with the second flow passage 36 within the coupler 28 when the mix head 20 is attached thereto (FIG. 2B). The mix head 20 secondary, second flow passage 36' includes a second piston 44 which is movable along a second axis 45 as illustrated by double headed arrow S. The second piston 44 is preferably circular in cross section and is movable within a liner 46 as described above. The diameter of the second piston 44 is preferably less than the width of the wall of the first passage 34 to which the second flow passage 36 intersects.

The second piston 44 is movable along the second axis 45 by a second actuator 48. Although a rotatable pinion gear 50 and rack 52 having corresponding gear teeth 54 are illustrated in the disclosed embodiment, other actuators such as a pneumatic, electrical or hydraulic actuators will also benefit from the present invention.

A third fluid passage 56 communicates with the mix head 20 mix chamber (illustrated schematically at 58) and the secondary second flow passage 36'. Preferably, the third flow passage 56 runs substantially parallel to the second flow passage 36' from the mix chamber 58 then bends to intercept the second flow passage 36' in a substantially perpendicular relationship. Although other paths for the third flow passage will benefit from the present invention, a substantially perpendicular relationship assures that the second piston 44 will effectively seal the third flow passage 56 and shear remnants of the matrix into the first flow passage 34.

Figure 4:
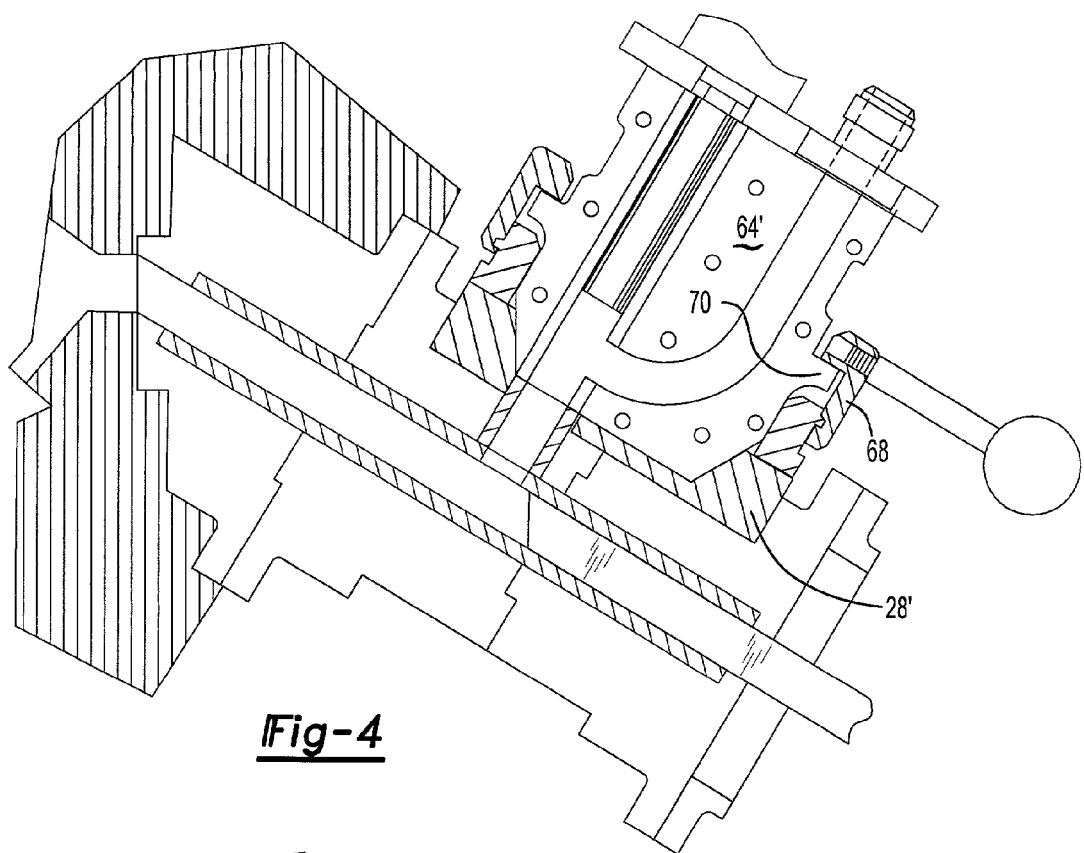
FIG. 4 is another embodiment of a locking assembly according to the present invention.

A locking assembly 60 extends about the coupler 28 to engage and retain the mix head 20 to the mold assembly 22. The locking assembly 60 includes a multiple of movable lugs 62 which collapse around a nozzle 64 of the mix head 20 to engage receptors 66. In another embodiment, a threaded nut 68 (FIG. 4) on coupler 28' engages a complimentary thread 70 on the nozzle 64'. It should be understood that other locking arrangements such as electromagnetic, linear, radial, and other locks will benefit from the present invention. Alternatively or additionally, the lock assembly manually and/or automatically activated such that the mix head is securely locked into the coupler during injection of the matrix while also providing rapid disengagement suitable for an assembly line-like environment.

Figure 5A:
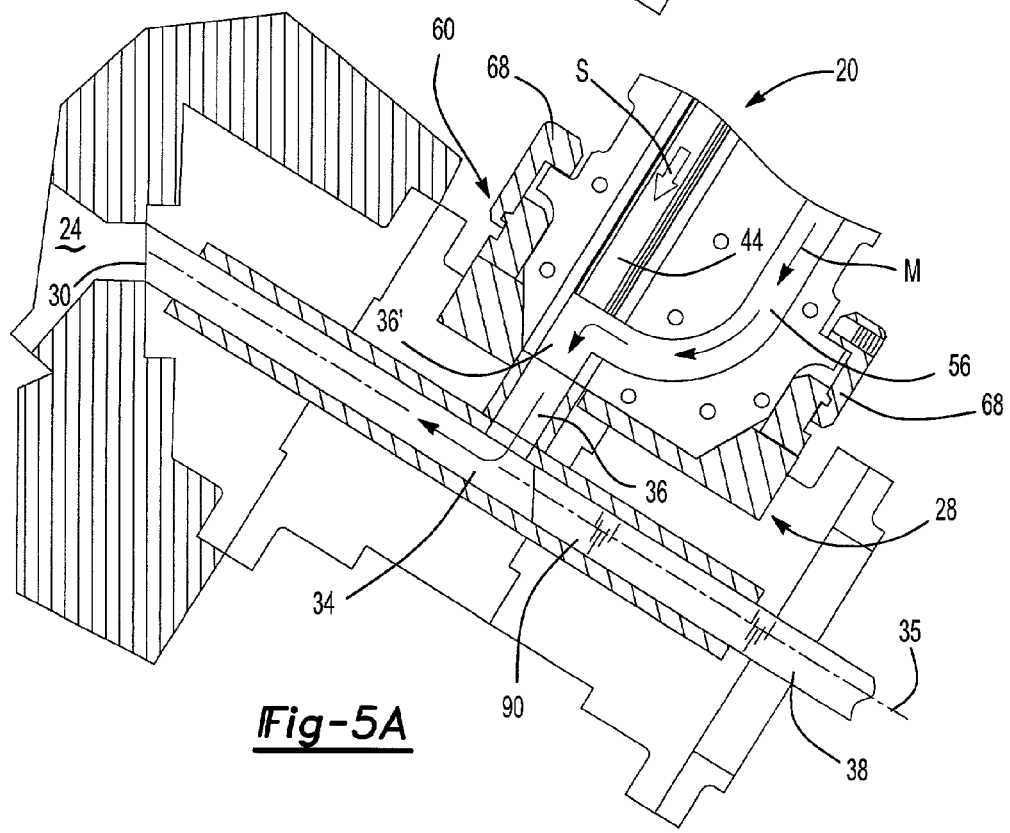
FIG. 5A is a sectional view of the valve assembly in a first position which schematically illustrated a fluid material flow path.

FIG. 5A illustrates the matrix flow path (illustrated schematically by arrows m) during matrix injection into the mold cavity after the lock assembly 60 has securely locked the mix head 20 into the coupler 28. During matrix injection, matrix is pumped under pressure of the feed system 14 (FIG. 1) from the mix chamber 58 (FIG. 2B), through the third flow passage 56 and into the mix head 20 second flow passage 36'. The matrix continues into the coupler 28 second flow passage 36 and into the first flow passage 34. The matrix then passes into the mold cavity 24 through the mold port 30.

Figure 5B:
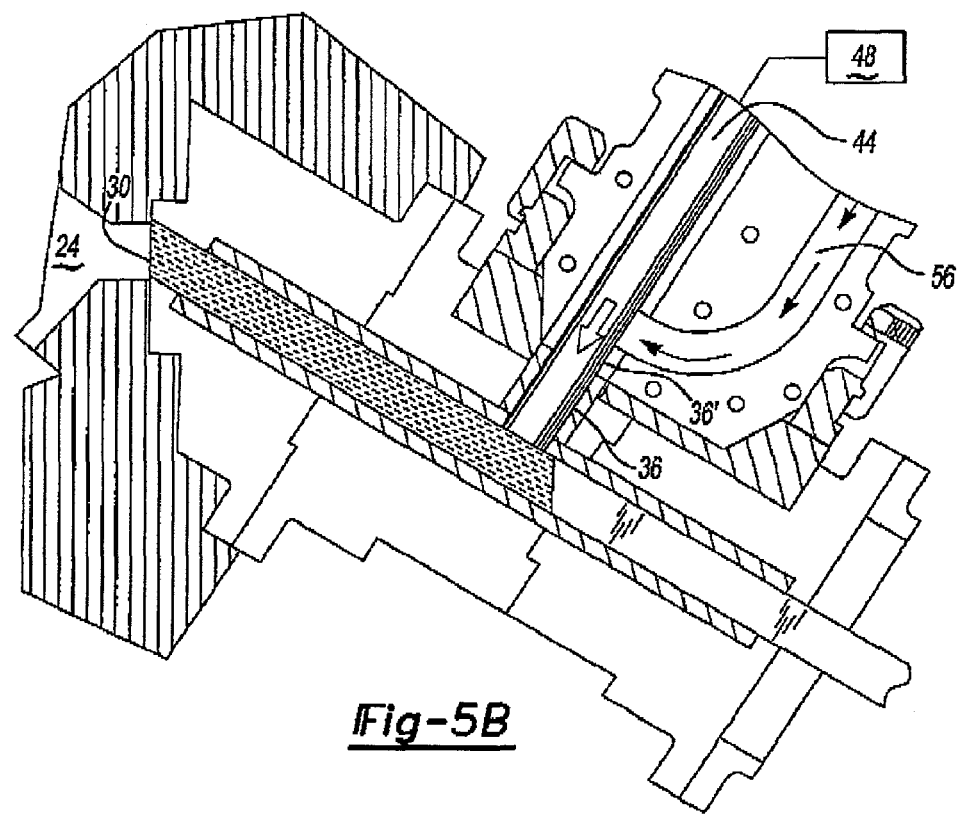
FIG. 5B is a sectional view of the valve assembly in an intermediate position.
Figure 5C:
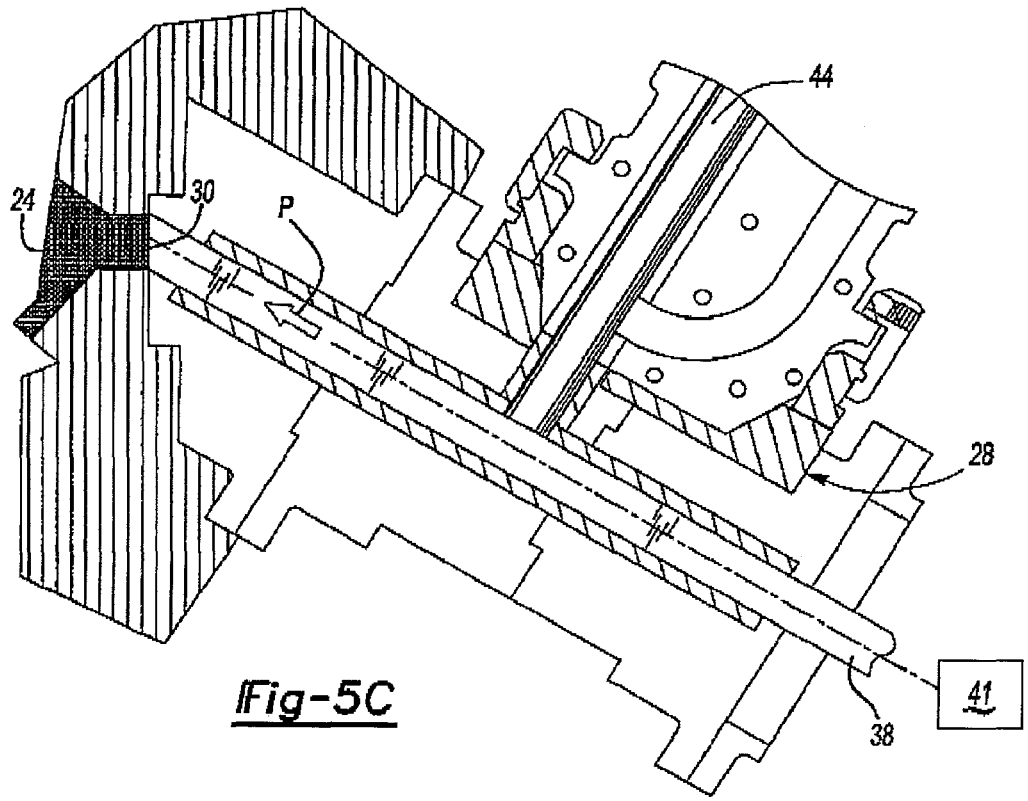
FIG. 5C is a sectional view of the valve assembly in a partially open position.

After injection is complete, the second piston 44 is driven by the second actuator (illustrated schematically at 48 to seal the third flow passage 56 (FIG. 5B). As illustrated in FIG. 5B, the second piston extends from the mix head second flow passage 36' and into the coupler 28 second flow passage 36. In other words, the second piston 44 meets the first flow passage 39 in a substantially perpendicular orientation. Simultaneously remnants of the matrix which remain in the second flow passage 36', 36 are driven into the first flow passage 34 by the piston 44. Notably, the second piston 44 has been driven past the mix head second flow passage 36' and into the coupler flow passage 36. In other words, the second piston 44 assures that the second flow passage 36' is clear of matrix remnants.

Referring to FIG. 5C, piston 38 is now driven toward the mold port 30 by actuator 40 (illustrated schematically). Notably, the orientation of the first piston 38 and second piston 44 provides for the first piston 38 to wipe matrix remnants from a face of the second piston 44. The seal between piston 38 and mold port 30 is now complete and the molded article cures within the cavity 24. The coupler 28 is thus clear of remnants without flushing.

Figure 5D:
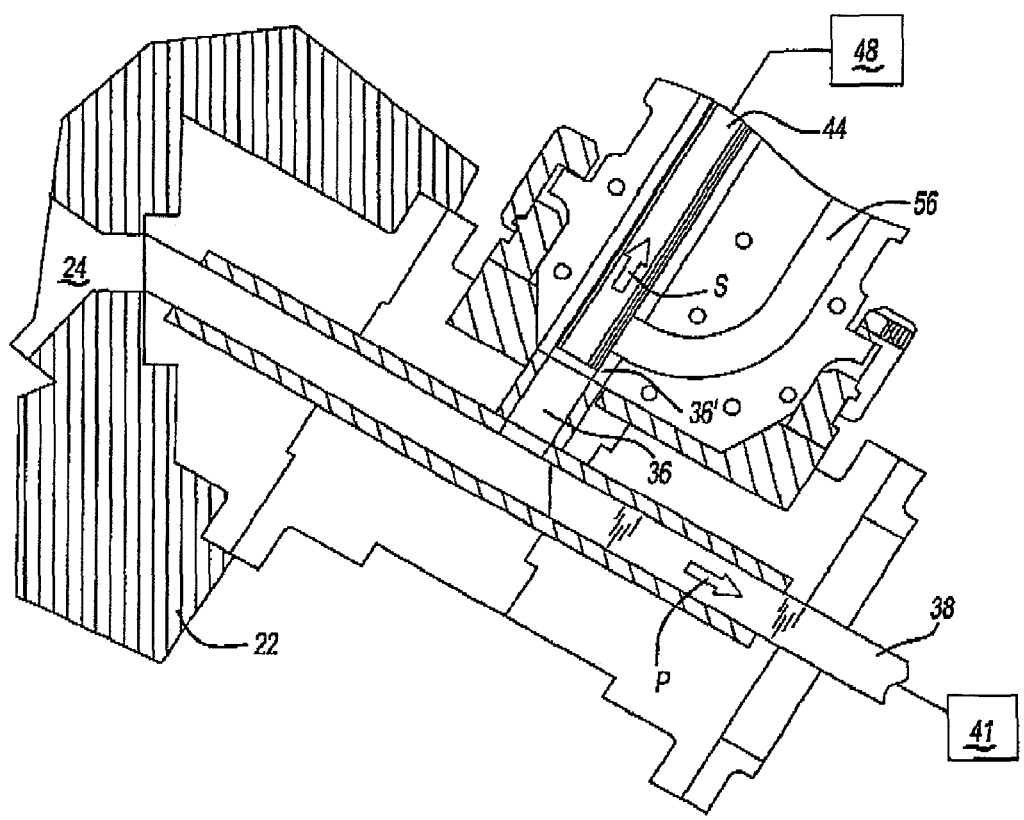
FIG. 5D is a sectional view of the valve assembly in another partially open position.

Finally, the second piston 44 is retracted to its original position within the mix head 20 (FIG. 5A). The lock assembly 60 is disengaged and the mix head 20 may be directed to another mold assembly where the process is repeated (FIG. 2A). It should be understood that the second piston 44 can also be partially retracted such that the third flow passage 56 is sealed by the second piston 44 (FIG. 5D) prior to full retraction (FIG. 5A) to prevent inadvertent leakage of the matrix while the mix head is being transported from one mold assembly to the next.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A valve assembly for a low pressure mold assembly comprising:
   a port to a mold assembly;
   a coupler for receipt of a mix head along a mix head axis;
   a fluid flow passage from said coupler to said port; and
   a piston which is substantially rectilinear in cross-section, said piston movable within said fluid flow passage along a first axis between a first position which allows flow from said coupler to said port, and a second position which seals said port.

2. The valve assembly as recited in claim 1, wherein said piston is substantially square in cross-section.

3. The valve assembly as recited in claim 1, wherein said port includes a port end portion which is angled relative to said first axis.

4. The valve assembly as recited in claim 3, wherein said piston includes a piston end portion which is angled relative to said first axis.

5. The valve assembly as recited in claim 1, wherein said fluid flow passage includes a first flow passage along said first axis and a second flow passage substantially perpendicular to said first axis.

6. The valve assembly as recited in claim 1, wherein said second passage includes a first second passage portion within said a coupler head, and a second; second passage portion within the mix head.

7. The valve assembly as recited in claim 5, further including a second piston movable within said second flow passage.

8. The valve assembly as recited in claim 7, wherein said second piston is substantially circular in cross section.

9. The valve assembly as recited in claim 7, wherein said fluid flow passage includes a third flow passage which communicates with said second flow passage in a substantially perpendicular relationship.

10. The valve assembly as recited in claim 9, wherein said second piston is movable between a first position which allows flow from said third flow passage to said second flow passage and a second position which prevents fluid flow from said third flow passage to said second flow passage.

11. The valve assembly as recited in claim 1, further including a lock assembly within said coupler, said lock assembly engageable with the mix head.

12. A low pressure mold assembly for receipt or a mix head comprising:
    a port to the mold assembly;
    a coupler for receipt of the mix head along a mix head axis;
    a fluid flow passage from said coupler to said port, said fluid flow passage including a first flow passage defining a first axis and a second flow passage substantially parallel to said mix head axis; and
    a piston substantially rectilinear in cross-section, said piston movable within said fluid flow passage along said first axis between a first position which allows flow from said coupler mix head to said port, and a second position which seals said port.

13. The mold assembly as recited in claim 12, wherein said piston is substantially square in cross-section.

14. The mold assembly as recited in claim 12, wherein said port includes a port end portion which is angled relative to said first axis.

15. The mold assembly as recited in claim 14, wherein said piston includes a piston end portion which is angled relative to said first axis.

16. The mold assembly as recited in claim 12, wherein said second passage includes a first, second passage portion within the mix head, and a second, second passage portion within said coupler.

17. The mold assembly as recited in claim 16, further including a second piston movable from said first, second passage portion to said second, second passage portion.

18. The mold assembly as recited in claim 12, further including a second piston movable within said second flow passage.

19. The mold assembly as recited in claim 18, wherein said second piston is substantially circular in cross section.

20. The mold assembly as recited in claim 12, wherein the mix head includes a third flow passage which communicates with said second flow passage in a substantially perpendicular relationship.

21. The mold assembly as recited in claim 20, wherein said second piston is movable between a first position which allows flow from said third flow passage to said second flow passage and a second position which prevents fluid flow from said third flow passage to said second flow passage.

22. A low pressure mold system comprising:
    a mold assembly;
    a port to the mold assembly;
    a coupler for receipt of a mix head along a mix head axis said coupler including a first flow passage defining a first axis substantially perpendicular to said mix head axis;
    a piston which is substantially rectilinear in cross-section, said piston movable within said passage along said first axis between a first position which allows flow from said coupler to said port, and a second position which seals said port;
    a locking assembly for removably attaching said mix head to said coupler;
    said mix head including a second flow passage substantially parallel to said mix head axis; and
    a second piston movable within said second flow passage.

23. The valve assembly as recited in claim 22, wherein said mix head includes a third flow passage, said second piston movable between a first position which allows flow from said third flow passage to said second passage and a second position which prevents fluid flow from said third flow passage to said second flow passage.

24. The mold assembly as recited in claim 22, wherein said piston is substantially square in cross-section.

25. The mold assembly as recited in claim 22, wherein said port includes a port end portion which is angled relative to said first axis.

26. The mold assembly as recited in claim 25, wherein said piston includes a piston end portion which is angled relative to said first axis.

27. The valve assembly as recited in claim 1, wherein said piston comprises a piston end portion angled away from said mix head axis.

28. The valve assembly as recited in claim 1, further comprising a lock assembly within said coupler, said lock assembly engageable with an outer perimeter of the mix head.

29. The valve assembly as recited in claim 12, wherein said piston comprises a piston end portion angled away from an intersection between said first flow passage and said second flow passage.

30. The valve assembly as recited in claim 12, further comprising a lock assembly within said coupler, said lock assembly engageable with an outer perimeter of the mix head.

31. The valve assembly as recited in claim 22, wherein said piston comprises a piston end portion angled away from an intersection between said first flow passage and said second flow passage.

32. The valve assembly as recited in claim 22, wherein said piston comprises a piston end portion angled away from an intersection between said first flow passage and said second flow passage to shear across said second flow passage.

* * * * *